US012772284B2

(12) United States Patent
Zhu

(10) Patent No.: US 12,772,284 B2
(45) Date of Patent: Oct. 20, 2026

(54) DOWNLINK TRANSMISSION DETECTION METHOD AND APPARATUS, DEVICE, AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 555 days.

(21) Appl. No.: 17/623,141

(22) PCT Filed: Jun. 25, 2019

(86) PCT No.: PCT/CN2019/092852

§ 371 (c)(1),
(2) Date: Dec. 27, 2021

(87) PCT Pub. No.: WO2020/258048

PCT Pub. Date: Dec. 30, 2020

(65) Prior Publication Data

US 2022/0240315 A1 Jul. 28, 2022

(51) Int. Cl.
*H04W 74/0808* (2024.01)
*H04L 5/00* (2006.01)
(Continued)

(52) U.S. Cl.
CPC ....... *H04W 74/0808* (2013.01); *H04L 5/0053* (2013.01); *H04L 27/2655* (2013.01); *H04W 72/23* (2023.01)

(58) Field of Classification Search
CPC ......... H04W 74/0808; H04W 74/0891; H04W 74/006; H04W 74/0816; H04W 74/0825;
(Continued)

(56) References Cited

U.S. PATENT DOCUMENTS

2015/0189628 A1* 7/2015 Pan ....................... H04W 48/12 370/329
2017/0074833 A1* 3/2017 Takamine .............. G01N 21/88
(Continued)

FOREIGN PATENT DOCUMENTS

CN 108886788 A 11/2018
CN 109328482 A 2/2019
(Continued)

OTHER PUBLICATIONS

INOA of Application No. 202227003651 dated on Jun. 14, 2022 with English translation,(5).
(Continued)

*Primary Examiner* — Un C Cho
*Assistant Examiner* — Rasha K Fayed
(74) *Attorney, Agent, or Firm* — Arch & Lake LLP; Hao Tan; Shen Wang

(57) ABSTRACT

A detection method, device and apparatus, and a storage medium are provided for downlink transmission. In the method, a terminal obtains first configuration information, determines a detection parameter for downlink transmission according to the first configuration information, and detects the downlink transmission on an unlicensed frequency band according to the detection parameter.

18 Claims, 6 Drawing Sheets

(51) Int. Cl.
*H04L 27/26* (2006.01)
*H04W 72/23* (2023.01)

(58) Field of Classification Search
CPC ........... H04W 74/0866; H04W 74/085; H04W 74/08; H04W 74/0875; H04W 72/23; H04W 72/02; H04W 72/042; H04W 72/0453; H04W 72/1268; H04W 72/1284; H04W 72/20; H04W 72/21; H04W 72/52; H04W 72/56; H04W 72/0486; H04W 72/046; H04W 72/542; H04W 72/12; H04W 72/1215; H04W 72/54; H04W 72/0446; H04W 72/541; H04W 16/14; H04W 16/10; H04W 16/28; H04W 24/02; H04W 24/08; H04W 24/10; H04W 4/70; H04W 76/14; H04W 84/12; H04W 88/08; H04L 5/0053; H04L 5/0007; H04L 5/0094; H04L 5/0048; H04L 5/0091; H04L 5/0042; H04L 5/0005; H04L 5/001; H04L 5/0044; H04L 5/005; H04L 5/00; H04L 5/0032; H04L 5/006; H04L 5/0082; H04L 5/0023; H04L 5/0057; H04L 27/2655; H04L 27/0006; H04L 27/2626; H04L 27/2602; H04L 27/2608; H04L 27/2666; H04L 27/261; H04L 1/1812; H04L 1/1861; H04B 7/0695; H04B 7/088; H04B 7/2615

See application file for complete search history.

(56) References Cited

U.S. PATENT DOCUMENTS

2017/0094528 A1* 3/2017 Takeda .................. H04W 16/14
2017/0201892 A1* 7/2017 Wen ...................... H04B 7/0695
2017/0251375 A1* 8/2017 Yang ...................... H04W 16/14
2017/0280331 A1* 9/2017 Gou ....................... H04L 5/0007
2018/0091242 A1* 3/2018 Li ......................... H04B 17/318
2018/0249339 A1* 8/2018 Noh ....................... H04L 27/261
2019/0043603 A1* 2/2019 Tsai ........................ H03K 23/40
2019/0081842 A1* 3/2019 Kim ..................... H04L 27/2613
2019/0182828 A1 6/2019 Garcia-Saavedra et al.
2019/0199498 A1* 6/2019 Chen ...................... H04L 5/0007
2020/0029238 A1* 1/2020 Si ........................... H04W 24/10
2020/0068517 A1* 2/2020 Shi ......................... H04L 1/0061
2020/0177265 A1* 6/2020 Guan ...................... H04B 7/088
2020/0187250 A1* 6/2020 Bhattad ................. H04W 16/14
2020/0221506 A1* 7/2020 Jeon .................. H04W 74/0833
2020/0236677 A1* 7/2020 Cui ........................ H04W 72/23
2020/0404629 A1* 12/2020 Wang .................... H04W 72/23
2021/0029709 A1* 1/2021 Yoon ...................... H04L 5/0051
2021/0105816 A1* 4/2021 Wang .................... H04L 5/0053
2021/0226756 A1 7/2021 Zhu
2021/0274504 A1 9/2021 Zhu
2021/0298000 A1* 9/2021 Park ....................... H04W 72/23
2021/0352633 A1* 11/2021 Tiirola .................. H04L 5/0053
2021/0392684 A1* 12/2021 Tiirola .............. H04W 72/0453
2022/0061094 A1* 2/2022 Jung ................ H04W 74/0816
2022/0085938 A1* 3/2022 Kang ......................... H04L 1/00
2022/0166581 A1* 5/2022 Zhang ................... H04L 5/0023
2022/0240314 A1* 7/2022 Zhu ........................ H04L 5/0098
2022/0361176 A1 11/2022 Cui
2023/0032957 A1* 2/2023 Bhattad ............... H04W 74/006

FOREIGN PATENT DOCUMENTS

| | | | |
|---|---|---|---|
| CN | 109496456 | A | 3/2019 |
| CN | 109803395 | A | 5/2019 |
| CN | 109863807 | A | 6/2019 |
| EP | 3188433 | A1 | 7/2017 |
| EP | 3706483 | A1 | 9/2020 |
| EP | 3817473 | A1 | 5/2021 |
| WO | 2016119443 | A1 | 8/2016 |
| WO | 2018176634 | A1 | 10/2018 |
| WO | 2018177332 | A1 | 10/2018 |
| WO | 2019015456 | A1 | 1/2019 |

OTHER PUBLICATIONS

Extended European Search Report issued in Application No. 19934434.2, dated Dec. 13, 2022,(11p).
Chinese Patent Notice of Allowance of 201980001172.1 dated May 31, 2023, 3 pages.
International Search Report of PCT/CN2019/092852 dated Mar. 22, 2020 with English translation, (4p).

* cited by examiner

DOWNLINK TRANSMISSION DETECTION METHOD AND APPARATUS, DEVICE, AND STORAGE MEDIUM

CROSS-REFERENCE TO RELATED APPLICATION

The present disclosure is the U.S. national phase application of International Application No. PCT/CN2019/092852 filed on Jun. 25, 2019, the entire contents of which are incorporated herein by reference for all purposes.

TECHNICAL FIELD

The present disclosure relates to the field of communications, and in particular to a detection method, device and apparatus for downlink transmission and a storage medium.

BACKGROUND

The third generation partnership project (3GPP) has carried out research on new radio unlicensed (NR-U).

In order to ensure coexistence with other systems (such as Wi-Fi) on unlicensed frequency bands, a listen before talk (LBT) mechanism is introduced. When transmitting data, a base station needs to first detect whether a channel on the unlicensed frequency band is idle; and only when the channel is in an idle state, the base station can transmit data to a terminal.

In a traditional method, the base station after occupying the channel on the unlicensed frequency band, will transmit a cell-specific reference signal (CRS) on each subframe. However, in the 5G system, there is no downlink transmission that is always transmitted. Therefore, how the terminal detects the channel occupation of the base station on the unlicensed frequency band has become a new technical problem.

SUMMARY

Embodiments of the present disclosure provide a detection method, device and apparatus for downlink transmission and a storage medium.

An aspect of the present disclosure provides detection method for downlink transmission, including:

obtaining first configuration information;

determining a detection parameter for the downlink transmission according to the first configuration information; and detecting the downlink transmission on an unlicensed frequency band according to the detection parameter.

In an optical embodiment, determining the detection parameter for the downlink transmission according to the first configuration information includes:

determining the detection parameter for the downlink transmission from a detection parameter set according to the first configuration information, wherein the detection parameter set includes at least two groups of detection parameters.

In an optical embodiment, the detection parameter includes a type of a to-be-detected signal or to-be-detected signaling, and the type of the to-be-detected signal or the to-be-detected signaling includes at least one of:

a broadband demodulation reference signal;

a group commonality physical downlink control channel;

a synchronization signal block;

a demodulation reference signal and the group commonality physical downlink control channel; and a channel-state information reference signal.

In an optical embodiment, the detection parameter includes a detection frequency for the downlink transmission.

In an optical embodiment, the detection parameter includes a detection mode, and the detection mode includes at least one of:

time-frequency position information of the to-be-detected signal or the to-be-detected signaling when being transmitted;

beam information of the to-be-detected signal or the to-be-detected signaling when being transmitted;

sequence information corresponding to the to-be-detected signal; and at least one of a length of downlink control information, a number of detections and an aggregation level, the length of the downlink control information, the number of detections and the aggregation level corresponding to the to-be-detected signaling.

In an optical embodiment, the first configuration information configures at least two groups of the detection parameters for the downlink transmission, and detecting the downlink transmission on the unlicensed frequency band according to the detection parameter includes:

detecting different downlink transmissions on different positions of the unlicensed frequency band according to the at least two groups of the detection parameters for the downlink transmission.

In an optical embodiment, the method further includes:

obtaining the detection parameter set, wherein the detection parameter set is predefined; or receiving second configuration information, wherein the second configuration information is configured to configure the detection parameter set.

An aspect of the present disclosure provides a detection method for downlink transmission, including:

transmitting first configuration information, wherein the first configuration information is configured to configure a detection parameter for the downlink transmission;

performing a clear channel assessment on a channel on an unlicensed frequency band; and transmitting the downlink transmission on the channel in response to the channel being in an idle state.

In an optical embodiment, the first configuration information is configured to determine the detection parameter for the downlink transmission from a detection parameter set, wherein the detection parameter set includes at least two groups of detection parameters.

In an optical embodiment, the detection parameter includes a type of a to-be-detected signal or to-be-detected signaling, and the type of the to-be-detected signal or the to-be-detected signaling includes at least one of:

a broadband demodulation reference signal;

a group commonality physical downlink control channel;

a synchronization signal block;

a demodulation reference signal and the group commonality physical downlink control channel; and a channel-state information reference signal.

In an optical embodiment, the detection parameter includes a detection frequency for the downlink transmission.

In an optical embodiment, the detection parameter includes a detection mode, and the detection mode includes at least one of:

time-frequency position information of the to-be-detected signal or the to-be-detected signaling when being transmitted;

beam information of the to-be-detected signal or the to-be-detected signaling when being transmitted;

sequence information corresponding to the to-be-detected signal; and at least one of a length of downlink control information, a number of detections and an aggregation level, the length of the downlink control information, the number of detections and the aggregation level corresponding to the to-be-detected signaling.

In an optical embodiment, the first configuration information is configured to configure at least two groups of the detection parameters for the downlink transmission, and the at least two groups of the detection parameters for the downlink transmission are configured for a terminal to detect different downlink transmissions on different positions of the unlicensed frequency band.

In an optical embodiment, the method further includes:

transmitting second configuration information, wherein the second configuration information is configured to configure the detection parameter set.

An aspect of the present disclosure provides a detection device for downlink transmission, including:

an obtaining module, configured to obtain first configuration information;

a determining module, configured to determine a detection parameter for the downlink transmission according to the first configuration information; and a detection module, configured to detect the downlink transmission on an unlicensed frequency band according to the detection parameter.

In an optical embodiment, the determining module is configured to determine the detection parameter for the downlink transmission from a detection parameter set according to the first configuration information, and wherein the detection parameter set includes at least two groups of detection parameters.

In an optical embodiment, the detection parameter includes a type of a to-be-detected signal or to-be-detected signaling, and the type of the to-be-detected signal or the to-be-detected signaling includes at least one of:

a broadband demodulation reference signal;

a group commonality physical downlink control channel;

a synchronization signal block;

a demodulation reference signal and the group commonality physical downlink control channel; and a channel-state information reference signal.

In an optical embodiment, the detection parameter includes a detection frequency for the downlink transmission.

In an optical embodiment, the detection parameter includes a detection mode, and the detection mode includes at least one of:

time-frequency position information of the to-be-detected signal or the to-be-detected signaling when being transmitted;

beam information of the to-be-detected signal or the to-be-detected signaling when being transmitted;

sequence information corresponding to the to-be-detected signal; and at least one of a length of downlink control, a number of detections and an aggregation level, the length of the downlink control information, the number of detections and the aggregation level corresponding to the to-be-detected signaling.

In an optical embodiment, the first configuration information configures at least two groups of the detection parameters for the downlink transmission, and the detection module is configured to detect different downlink transmissions on different positions of the unlicensed frequency band according to the at least two groups of the detection parameters for the downlink transmission.

In an optical embodiment, the device further includes:

the obtaining module further configured to: obtain the detection parameter set, wherein the detection parameter set is predefined; or receive second configuration information, wherein the second configuration information is configured to configure the detection parameter set.

An aspect of the present disclosure provides a detection device for downlink transmission, including:

a transmitting module, configured to transmit first configuration information, wherein the first configuration information is configured to configure a detection parameter for the downlink transmission; and an evaluation module, configured to perform a clear channel assessment on a channel on an unlicensed frequency band, and the transmitting module is further configured to transmit the downlink transmission by occupying the channel on the unlicensed frequency band in response to the channel being in an idle state.

In an optical embodiment, the first configuration information is configured to determine the detection parameter for the downlink transmission from a detection parameter set, wherein the detection parameter set includes at least two groups of detection parameters.

In an optical embodiment, the detection parameter includes a type of a to-be-detected signal or to-be-detected signaling, and the type of the to-be-detected signal or the to-be-detected signaling includes at least one of:

a broadband demodulation reference signal;

a group commonality physical downlink control channel;

a synchronization signal block;

a demodulation reference signal and the group commonality physical downlink control channel; and a channel-state information reference signal.

In an optical embodiment, the detection parameter includes a detection frequency for the downlink transmission.

In an optical embodiment, the detection parameter includes a detection mode, and the detection mode includes at least one of:

time-frequency position information of the to-be-detected signal or the to-be-detected signaling when being transmitted;

beam information of the to-be-detected signal or the to-be-detected signaling when being transmitted;

sequence information corresponding to the to-be-detected signal; and at least one of a length of downlink control information, a number of detections and an aggregation level, the length of the downlink control information, the number of detections and the aggregation level corresponding to the to-be-detected signaling.

In an optical embodiment, the first configuration information is configured to configure at least two groups of the detection parameters for the downlink transmission, and the at least two groups of the detection parameters for the downlink transmission are configured for a terminal to detect different downlink transmissions on different positions of the unlicensed frequency band.

In an optical embodiment, the transmitting module is configured to transmit second configuration information, wherein the second configuration information is configured to configure the detection parameter set.

An aspect of the present disclosure provides a terminal, including:

a processor; and a transceiver coupled to the processor, wherein the processor is configured to load and execute executable instructions to implement the above detection method for downlink transmission.

An aspect of the present disclosure provides an access network device, including:

a processor; and a transceiver coupled to the processor, wherein the processor is configured to load and execute executable instructions to implement the above detection method for downlink transmission.

An aspect of the present disclosure provides a computer-readable storage medium having at least one instruction, at least one program, a code set, or an instruction set stored thereon, the at least one instruction, the at least one program, the code set or the instruction set is loaded and executed by a processor to implement the above detection method for downlink transmission.

An aspect of the present disclosure provides a terminal, including:

a processor; and a transceiver coupled to the processor, wherein the processor is configured to load and execute executable instructions to implement the above detection method for downlink transmission.

An aspect of the present disclosure provides an access network device, including:

a processor; and a transceiver coupled to the processor, wherein the processor is configured to load and execute executable instructions to implement the above detection method for downlink transmission.

An aspect of the present disclosure provides a computer-readable storage medium having at least one instruction, at least one program, a code set, or an instruction set stored thereon, the at least one instruction, the at least one program, the code set or the instruction set is loaded and executed by a processor to implement the above detection method for downlink transmission.

BRIEF DESCRIPTION OF THE DRAWINGS

In order to more clearly describe the technical solutions in the embodiments of the present disclosure, the drawings, which are needed in the description of the embodiments, will be briefly introduced below. Obviously, the drawings in the following description are only some embodiments of the present disclosure. For those skilled in the art, other drawings may be obtained based on these drawings without creative work.

DETAILED DESCRIPTION

Figure 1:
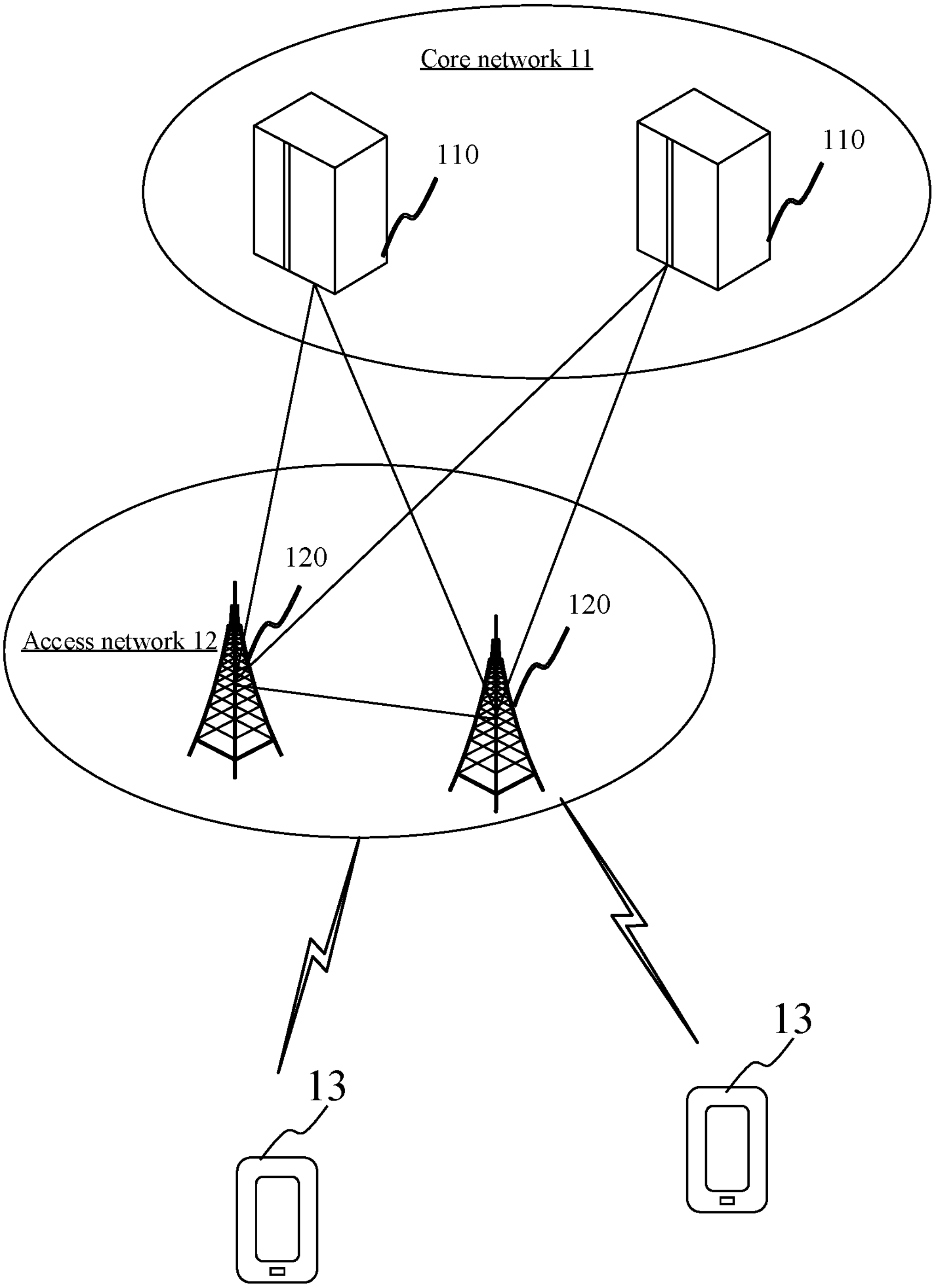
FIG. 1 is a block diagram of a communication system according to an exemplary embodiment of the present disclosure.

In order to make the objective, technical solution, and advantage of the present disclosure clear, implementations of the present disclosure will be further described in detail below in conjunction with the accompanying drawings.

Before introducing and explaining the embodiments of the present disclosure, a channel detection mechanism involved in the present disclosure is first explained.

The channel detection mechanism usually includes the following five types.

A first type (LBT Cat.1) does not include LBT, that is, a terminal does not perform channel detection before transmitting information, and transmits the information directly. The LBT may also be called a listening and avoiding mechanism, which is used to realize effective sharing of the unlicensed spectrum. The LBT requires to listen to the channel and perform clear channel assessment (CCA) before information is transmitted, and transmission is performed when the channel is idle.

A second type (LBT Cat.2) is an LBT mechanism without random backoff process. Before transmitting information, the terminal only needs to detect a time granularity, for example, the time granularity may be 25 us. If the channel is idle within the time granularity, the terminal may transmit information; otherwise, the LBT fails and the terminal cannot transmit information.

A third type (LBT Cat.3) is a random backoff LBT mechanism with a fixed contention window size (CWS). A transmitting terminal first detects whether the channel corresponding to the beam is idle within a first time granularity. If the channel corresponding to the beam is detected to be idle, a random number value N is selected in a first competition window, and the channel detection is performed within a second time granularity as the time granularity. If the channel corresponding to the beam is detected to be idle within the second time granularity, and the random number value is not 0, the random number value is reduced by 1, and the channel detection is continued to be performed within the second time granularity as the time granularity. If the channel corresponding to the beam is detected to be busy within the second time granularity, the channel detection is performed again within the first time granularity as the time granularity. If the channel corresponding to the beam is detected to be idle within the first time granularity again, and the random number value is not 0, the random number value is reduced by 1, and the channel detection is performed within the second time granularity as the time granularity. Until the random number value is reduced to 0, it indicates that the channel is idle.

A fourth type (LBT Cat.4) is a random backoff LBT mechanism with a variable CWS. That is, on the basis of LBT Cat.3, the transmitting terminal may adjust the CWS according to the result of a previous transmission. For example, in the data transmitted within a reference time during the previous transmission, the proportion of data that was not received correctly is X. When X is greater than a threshold, the CWS value increases. In order to refine the parameter settings in the LBT process, four priorities are set in LBT Cat.4, respective priorities correspond to different parameter configurations, and data transmissions of different service types correspond to different priorities.

The principle of LBT Cat.4 is as follows. The terminal first detects whether the channel corresponding to the beam is idle within the first time granularity. If the channel corresponding to the beam is detected to be idle, a random number value N is selected in a first competition window, and the channel detection is performed within a second time granularity as the time granularity. If the channel corresponding to the beam is detected to be idle within the second time granularity, and the random number value is not 0, the random number value is reduced by 1, and the channel detection is continued to be performed within the second time granularity as the time granularity. If the channel corresponding to the beam is detected to be busy within the second time granularity, the channel detection is performed again within the first time granularity as the time granularity. If the channel corresponding to the beam is detected to be idle within the first time granularity again, and the random number value is not 0, the random number value is reduced by 1, and the channel detection is performed within the second time granularity as the time granularity. Until the random number value is reduced to 0, it indicates that the channel is idle.

For example, if the first time granularity is 16 us+M*9 us, and the second time granularity is 9 us, it first detects whether the channel is idle within 16 us+M*9 us. If the channel is idle, the random number value N is selected in the competition window, and then the 9 us is used as the granularity for detection. If the channel is idle, then N−1, and the 9 us is continued to be used as the granularity for detection; otherwise, the 16 us+M*9 us is used as the granularity for channel detection. When the detection channel is idle, then N−1, and the detection is restored to be performed within the 9 us as the granularity. Until the random number value is 0, it means that the channel is idle and can be used.

The value of the above M is determined by $m_p$ in Table 1 and Table 2, and channel access priority values p are different, and the values of M are different. Table-1 is the configuration of four priority parameters for downlink LBT Cat.4, and Table-2 is the configuration of four priority parameters for uplink LBT Cat.4, which are only slightly different in configuration values.

TABLE 1

| Channel access priority (p) | $m_p$ | $CW_{min,p}$ | $CW_{max,p}$ | $T_{mcot,p}$ | $CW_p$ optical value |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

TABLE 2

| Channel access priority (p) | $m_p$ | $CW_{min,p}$ | $CW_{max,p}$ | $T_{mcot,p}$ | $CW_p$ optical value |
|---|---|---|---|---|---|
| 1 | 2 | 3 | 7 | 2 ms | {3, 7} |
| 2 | 2 | 7 | 15 | 3 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

Among the four channel access priorities shown in Table-1 and Table-2, the smaller the p value, the higher the corresponding priority. $m_p$ is the number of extended clear channel assessments (ECCA) included in a delay time. Each delay time is composed of a fixed 16 us duration and $m_p$ ECCAs, which is the first time granularity described above. $CW_{min,p}$ and $CW_{max,p}$ are the minimum competition window value and the maximum competition window value respectively. The CWS in the LBT process is generated between these two values, and then the length of the backoff time in the LBT channel detection process is determined by a backoff counter N randomly generated from 0 to the generated competition window $CW_p$. $T_{mcot,p}$ is the maximum time length that can be occupied after the LBT Cat.4 corresponding to each priority is executed successfully. The above tables show that comparison with priorities 1 and 2, the execution time of the LBT process of priorities 3 and 4 is relatively long, and the chance of obtaining channel access thereof is relatively low, and in order to ensure fairness, the maximum transmission time that can be occupied by data transmission using these two priorities is also relatively long.

A fifth type is a channel detection mechanism based on a frame structure, i.e., frame based equipment (FBE). For the FBE, a period is set, and a channel detection is performed at a fixed position in each period, for example, the CCA detection is performed during each CCA detection time. If the channel status is detected to be idle, the channel may be occupied for transmission, and the maximum channel occupation time length is fixed. The CCA detection will be performed again when the CCA detection time of the next period is reached. if the channel status is detected to be non-idle, and in the period, the internal terminal cannot occupy the channel, and the detection is continued to be performed at the fixed position in a next period. The fixed period refers to a time domain unit of FBE scheduling. For example, the fixed period may be a fixed frame period (FFP). The length of the fixed period may be pre-defined by an agreement.

It should be noted that the above five channel detection mechanisms are only exemplarily illustrated. With the development of communication technology, the above five channel detection mechanisms may be changed, or new channel detection mechanisms may be developed, but they are all applicable to the technical solution described in the present disclosure.

FIG. 1 shows a block diagram of a communication system according to an exemplary embodiment of the present disclosure. The communication system may include a core network 11, an access network 12, and a terminal 13.

The core network 11 includes several core network devices 110. The core network device 110 includes devices for access and mobility management function (AMF), session management function (SMF), user plane function (UPF) and the like. The AMF is configured to control an access right of a terminal, a switching function and the like, the SMF is configured to provide server continuity and uninterrupted user experience of the server, such as IP address and anchor point change.

The access network 12 includes several access network devices 120. The access network device 120 may be a base station, which is a device deployed in an access network to provide a wireless communication function for a terminal. The base station may include various forms of macro base stations, micro base stations, relay stations, access points, and so on. In systems using different wireless access technologies, the names of devices with base station functions may be different. For example, in the long term evolution (LTE) system, the base station is called eNodeB or eNB; and in the New Radio (NR) system, the base station is called gNode B or gNB. With the development of communication technology, the description of the name "base station" may be changed. For convenience, in the embodiments of the present disclosure, the above-mentioned devices that provide the wireless communication function for the terminal are collectively referred to as the access network device.

The terminal 13 may include various handheld devices with wireless communication functions, vehicle-mounted devices, wearable devices, computing devices or other processing devices connected to a wireless modem, as well as various forms of user equipment (UE), mobile stations (MS), terminal devices and so on. For ease of description, the devices mentioned above are collectively referred to as terminals. The access network device 120 and the terminal 13 communicate with each other through a certain radio technology, such as a Uu interface.

Optionally, during the wireless communication between the aforementioned terminal 13 and the access network device 120, the wireless communication may be performed through a licensed frequency band, or the wireless communication may be performed through an unlicensed frequency band. Optionally, in an embodiment of the present disclosure, the description is given by taking that the wireless communication between the terminal 13 and the access network device 120 is performed through the unlicensed frequency band as an example.

The above-mentioned access network device may be a base station in the NR-U networking architecture. Optionally, the aforementioned communication system also fairly shares unlicensed spectrum with other communication systems such as Wi-Fi.

Figure 2:
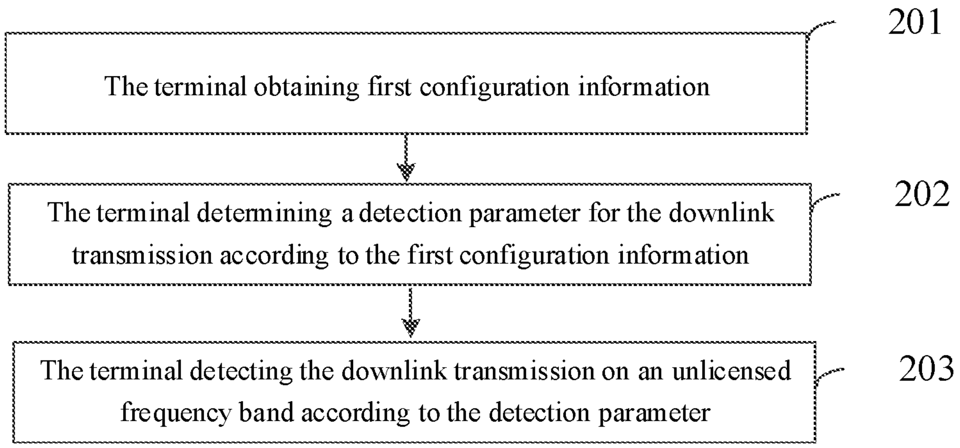
FIG. 2 is a flowchart of a detection method for downlink transmission according to another exemplary embodiment of the present disclosure.

FIG. 2 illustrates a flowchart of a detection method for downlink transmission according to an exemplary embodiment of the present disclosure. In the present disclosure, the method is described by taking that the method is applied to the terminal shown in FIG. 1 as an example, and the method includes steps 201 to 203.

In step 201, a terminal obtains first configuration information.

The first configuration information is configured to configure a detection parameter for downlink transmission. The downlink transmission is transmitted when an access network device performs a clear channel assessment (CCA) on a channel on an unlicensed frequency band, and the channel on the unlicensed frequency band is in an idle state. Optionally, the downlink transmission includes a signal or signaling for identifying downlink channel occupancy, or a signal or signaling for identifying downlink channel occupancy time, or a signal or signaling for identifying downlink channel occupancy and downlink channel occupancy time.

Optionally, the first configuration information is predefined by a communication protocol, or the first configuration information is transmitted by a base station through a radio resource control (RRC) message, or the first configuration information is transmitted by the base station through a media access control element (MAC CE), or the first configuration information is transmitted by the base station through physical layer signaling.

In step 202, the terminal determines a detection parameter for the downlink transmission according to the first configuration information.

The detection parameter for the downlink transmission includes at least one of a type of a to-be-detected signal or to-be-detected signaling, a detection frequency, and a detection mode.

The type of the to-be-detected signal or the to-be-detected signaling includes at least one of:

- a broadband demodulation reference signal (DMRS);
- a group commonality physical downlink control channel (GC-PDCCH);
- a synchronization signal block (SSB);
- a DMRS and the GC-PDCCH; and
- a channel-state information reference signal (CSI-RS).

The detection frequency is a frequency at which the terminal detects the signal or signaling on the channel of the unlicensed frequency band. For example, whether the channel occupancy time starts is detected every two orthogonal frequency-division multiplexing (OFDM) symbols.

The detection mode includes at least one of:

- time-frequency position information of the to-be-detected signal or the to-be-detected signaling when being transmitted;
- beam information of the to-be-detected signal or the to-be-detected signaling when being transmitted;
- sequence information corresponding to the to-be-detected signal such as ZC sequence; and
- at least one of a length of downlink control information (DCI), a number of detections and an aggregation level, the length of the downlink control information, the number of detections and the aggregation level corresponding to the to-be-detected signaling.

In step 203, the terminal detects the downlink transmission on an unlicensed frequency band according to the detection parameter.

When the terminal detects the downlink transmission (signal or signaling) on the unlicensed frequency band, it determines that the channel on the unlicensed frequency band starts to be occupied, and/or determines the channel occupation time. The channel occupation time does not exceed the maximum channel occupation time (MCOT).

In summary, in the method according to an embodiment, a terminal obtains first configuration information, determines a detection parameter for downlink transmission according to the first configuration information, and detects the downlink transmission on an unlicensed frequency band according to the detection parameter, so that the terminal may dynamically detect the downlink transmission according to the first configuration information, which solves the problem of that there is no downlink transmission that is always transmitted in the 5G system and thus the terminal cannot detect the channel occupation of the base station on the unlicensed frequency band, therefore the terminal can detect the channel occupancy of the base station on the unlicensed frequency band in time.

Figure 3:
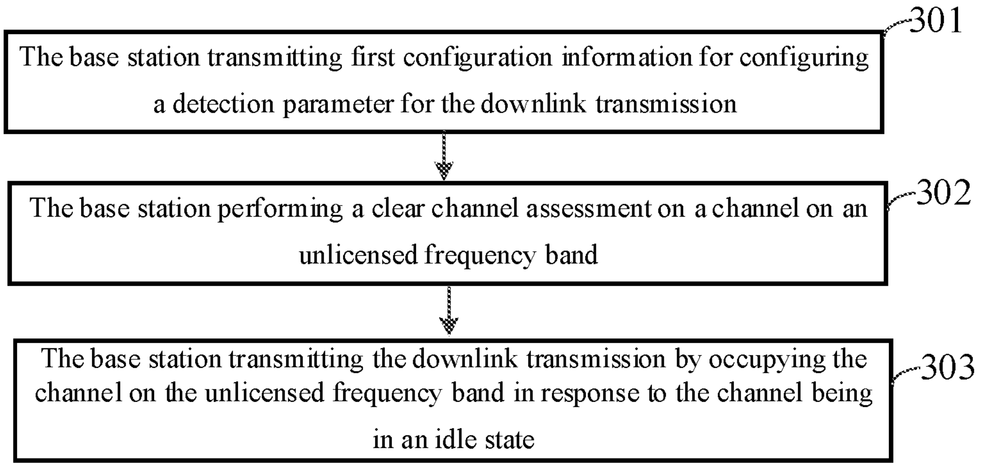
FIG. 3 is a flowchart of a detection method for downlink transmission according to another exemplary embodiment of the present disclosure.

FIG. 3 illustrates a flowchart of a detection method for downlink transmission according to an exemplary embodiment of the present disclosure. In the present disclosure, the method is described by taking that the method is applied to the access network device (base station) shown in FIG. 1 as an example, and the method includes steps 301 to 303.

In step 301, the base station transmits first configuration information, wherein the first configuration information is configured to configure a detection parameter for the downlink transmission.

Optionally, the downlink transmission includes a signal or signaling for identifying downlink channel occupancy, or a signal or signaling for identifying downlink channel occupancy time, or a signal or signaling for identifying downlink channel occupancy and downlink channel occupancy time.

Optionally, the base station transmits the first configuration information through an RRC message, MAC CE, or physical layer signaling.

Optionally, the detection parameter for the downlink transmission includes at least one of a type of a to-be-detected signal or to-be-detected signaling, a detection frequency, and a detection mode.

The type of the to-be-detected signal or the to-be-detected signaling includes at least one of:

a broadband DMRS;

a GC-PDCCH;

an SSB;

a DMRS and the GC-PDCCH; and a CSI-RS.

The detection frequency is a frequency at which the terminal detects the signal or signaling on the channel of the unlicensed frequency band. For example, whether the channel occupancy time starts is detected every two OFDM symbols.

The detection mode includes at least one of:

time-frequency position information of the to-be-detected signal or the to-be-detected signaling when being transmitted;

beam information of the to-be-detected signal or the to-be-detected signaling when being transmitted;

sequence information corresponding to the to-be-detected signal such as ZC sequence; and at least one of a length of DCI, a number of detections and an aggregation level, the length of the DCI, the number of detections and the aggregation level corresponding to the to-be-detected signaling.

In step 302, the base station performs a clear channel assessment on a channel on an unlicensed frequency band.

The base station uses the LBT mechanism to perform the clear channel assessment on the channel on the unlicensed frequency band. The LBT mechanism may be any one of the aforementioned LBT Cat.2, LBT Cat.3, and LBT Cat.4 mechanisms.

In step 303, the base station performs the downlink transmission by occupying the channel on the unlicensed frequency band in response to the channel being in an idle state.

Optionally, the downlink transmission includes a signal or signaling for identifying downlink channel occupancy, or a signal or signaling for identifying downlink channel occupancy time, or a signal or signaling for identifying downlink channel occupancy and downlink channel occupancy time.

In summary, in the method according to an embodiment, a base station transmits first configuration information configured to configure a detection parameter for the downlink transmission; performs a clear channel assessment on a channel on an unlicensed frequency band; and transmits the downlink transmission according to the detection parameter by occupying the channel in response to the channel being in an idle state, so that a terminal may dynamically detect the downlink transmission according to the first configuration information, which solves the problem of that there is no downlink transmission that is always transmitted in the 5G system and thus the terminal cannot detect the channel occupation of the base station on the unlicensed frequency band.

When the base station transmits the first configuration information to the terminal, the above-mentioned first configuration information may adopt any one (or two combinations or three combinations) of the following three configuration modes:

In a first configuration mode, a group of detection parameters is directly configured.

The detection parameter is directly carried in the first configuration information. For example, the first configuration information directly carries the type of the to-be-detected signal, the detection frequency, and the detection mode.

In a second configuration mode, a group of detection parameters is indicated from at least two groups of detection parameters in a detection parameter set provided in advance.

An identifier is carried in the first configuration information, and the identifier is configured to indicate a group of detection parameters in the detection parameter set. The detection parameter set includes at least two groups of detection parameters.

In a third configuration mode, at least two groups of detection parameters are indicated from at least two groups of detection parameters in the detection parameter set provided in advance.

The first configuration information carries n identifiers, the n identifiers are configured to indicate n groups of detection parameters in the detection parameter set, and n is an integer greater than or equal to 2. There are at least two groups of detection parameters to instruct the terminal to detect different signals or signaling at different detection positions.

For the second configuration mode, the following embodiments are provided.

Figure 4:
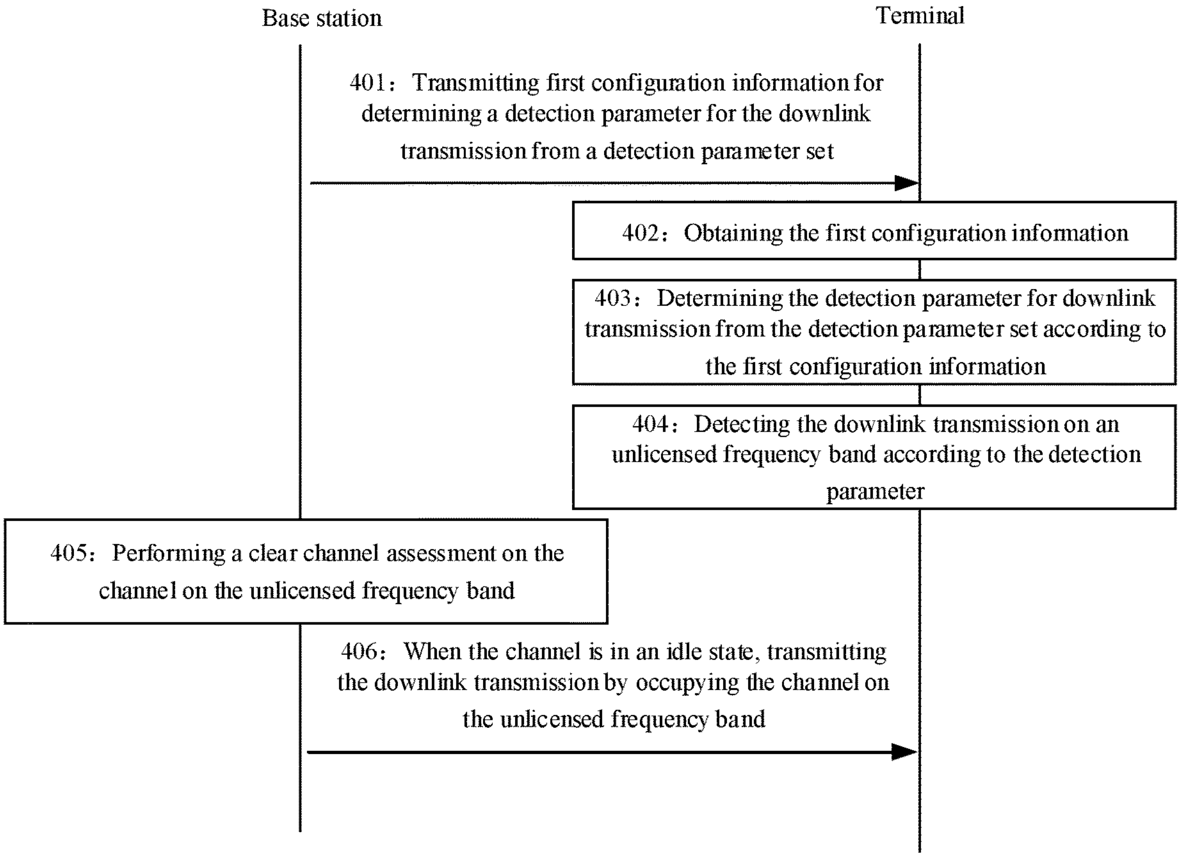
FIG. 4 is a flowchart of a detection method for downlink transmission according to another exemplary embodiment of the present disclosure.

FIG. 4 illustrates a flowchart of a detection method for downlink transmission according to an exemplary embodiment of the present disclosure. An embodiment illustrates that the method is applied to the communication system shown in FIG. 1, and the method includes steps 401 to 306.

In step 401, a base station transmits first configuration information, wherein the first configuration information is configured to determine a detection parameter for the downlink transmission from a detection parameter set.

The first configuration information carries an identifier of the detection parameter. The identifier is configured to identify one or a group of detection parameters among a plurality of groups of detection parameters in the detection parameter set.

Optionally, the base station transmits the first configuration information to a terminal through an RRC message, MAC CE, or physical layer signaling.

In step 402, the terminal obtains the first configuration information.

The terminal receives the RRC message transmitted by the base station and reads the first configuration information from the RRC message; or, the terminal receives the MAC CE transmitted by the base station, and reads the first configuration information from the MAC CE; or, the terminal receives the physical layer signaling transmitted by the base station, and reads the first configuration information from the physical layer signaling.

In step 403, the terminal determines the detection parameter for downlink transmission from the detection parameter set according to the first configuration information.

The detection parameter set includes a detection parameter and an identifier corresponding to the detection parameter. For example, the detection parameter set includes at least one of a set of types of to-be-detected signals or signaling, a set of detection frequencies, and a set of detection modes.

Table 1 exemplarily illustrates an example of a set of types of to-be-detected signals or signaling.

| Identifier | Type of to-be-detected signal or signaling |
|---|---|
| 1 | Broadband DMRS |
| 2 | GC-PDCCH |
| 3 | SSB |
| 4 | DMRS and GC-PDCCH |
| 5 | CSI-RS |

Table 2 exemplarily illustrates an example of a set of detection frequencies.

| Identifier | Detection frequency |
|---|---|
| 1 | Every 2 OFDM symbols |
| 2 | Every 4 OFDM symbols |
| 3 | First symbol of each time slot |

Table 3 exemplarily illustrates an example of a set of detection modes.

| Identifier | Detection mode |
|---|---|
| 1 | Time-frequency location information 1 |
| 2 | Time-frequency location information 2 + Beam information 1 |
| 3 | Sequence information 1 |
| 4 | Sequence information 2 |
| 5 | DCI length 1, number of detections 1 and aggregation level 1 |
| 6 | DCI length 2, number of detections 2 and aggregation level 2 |

The above Table 1 to Table 3 are only exemplary, and the specific form of the identifier and the manner that the identifier is carried in the first configuration information are not limited in the embodiment.

In step 404, the terminal detects the downlink transmission on an unlicensed frequency band according to the detection parameter.

For example, when the identifier carried in the first configuration information is (1, 1, 2), the terminal detects the broadband DMRS every 2 OFDM symbols at the detection position indicated by the time-frequency position information 2 and the beam information 1.

For another example, when the identifier carried in the first configuration information is (5, 2, 3), the terminal detects the CSI-RS every 4 OFDM symbols with the orthogonal sequence indicated by the sequence information 1.

For another example, when the identifier (3, 3) is carried in the first configuration information, the terminal detects the SSB at the first symbol of each time slot.

In step 405, the base station performs a clear channel assessment on the channel on the unlicensed frequency band.

The base station performs the clear channel assessment on the channel on the unlicensed frequency band by using the LBT mechanism. The LBT mechanism may be any one of the above LBT Cat.2, LBT Cat.3, and LBT Cat.4 mechanisms.

When the channel is in an idle state, it goes to step 406; and when the channel is in a busy state, it goes to a backoff time according to the LBT mechanism.

In step 406, when the channel is in an idle state, the base station transmits the downlink transmission by occupying the channel on the unlicensed frequency band.

The base station occupies the channel on the unlicensed frequency band, and transmits the downlink transmission (signal or signaling) according to the detection parameter indicated by the above-mentioned first configuration information.

When detecting the downlink transmission, the terminal determines that the channel on the unlicensed frequency band starts to be occupied, and/or the channel occupation time. The channel occupation time does not exceed the maximum channel occupation time (MCOT).

In summary, in the method according to an embodiment, a base station transmits first configuration information for configuring a detection parameter for downlink transmission; and a terminal detects the downlink transmission on an unlicensed channel according to the detection parameter, so that the terminal may dynamically detect the downlink transmission of different signal or signaling types according to the first configuration information, which solves the problem of that there is no downlink transmission that is always transmitted in the 5G system and thus the terminal cannot detect the channel occupation of the base station on the unlicensed frequency band.

Figure 5:
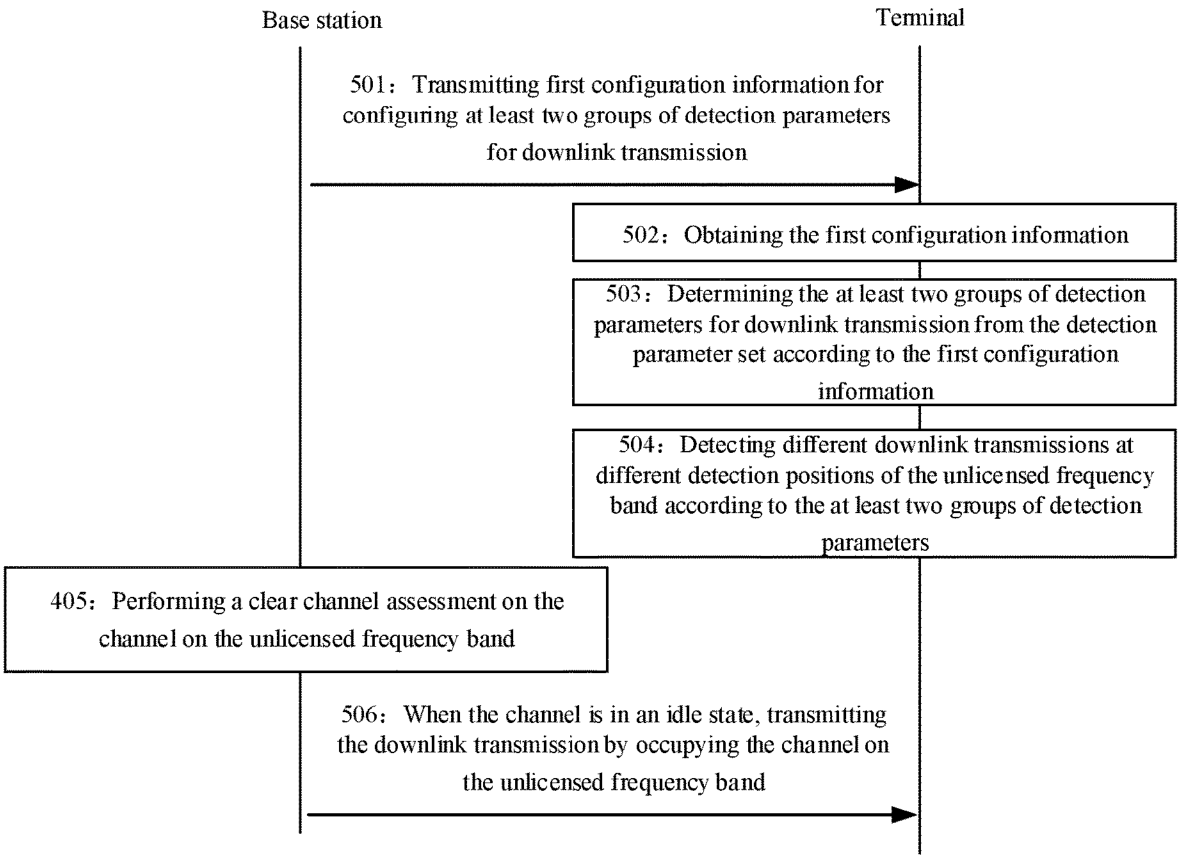
FIG. 5 is a flowchart of a detection method for downlink transmission according to another exemplary embodiment of the present disclosure.

For the third configuration mode, the following embodiments are provided:

FIG. 5 illustrates a flowchart of a detection method for downlink transmission according to an exemplary embodiment of the present disclosure. An embodiment illustrates that the method is applied to the communication system shown in FIG. 1, and the method includes steps 501 to 506.

In step 501, a base station transmits first configuration information, wherein the first configuration information is configured to configure at least two groups of detection parameters for downlink transmission.

At least two groups of detection parameters for downlink transmission are configured for a terminal to detect different downlink transmissions on different detection positions of an unlicensed frequency band.

Optionally, the first configuration information carries identifiers respectively corresponding to the at least two groups of detection parameters. Each identifier is configured to identify one or a group of detection parameters among a plurality of groups of detection parameters in the detection parameter set.

Optionally, the base station transmits the first configuration information to the terminal through an RRC message, MAC CE, or physical layer signaling.

In step 502, the terminal obtains the first configuration information.

The terminal receives the RRC message transmitted by the base station and reads the first configuration information from the RRC message; or, the terminal receives the MAC CE transmitted by the base station, and reads the first configuration information from the MAC CE; or, the terminal receives the physical layer signaling transmitted by the base station, and reads the first configuration information from the physical layer signaling.

In step 503, the terminal determines the at least two groups of detection parameters for downlink transmission from the detection parameter set according to the first configuration information.

The detection parameter set includes at least two groups of detection parameters and an identifier corresponding to each group of detection parameters. Each group of detection parameters at least includes a type of a to-be-detected signal or signaling and a detection position. There are at least two groups of detection parameters for the terminal to detect different downlink transmissions at different detection positions of the unlicensed frequency band.

Exemplarily, Table 4 exemplarily shows an example of the detection parameter set.

| Identifier | Signal or signaling type | Detection position |
|---|---|---|
| 1 | Broadband DMRS | Position of an odd-numbered OFDM symbol of each time slot |
| 2 | GC-PDCCH | Starting position of each time slot |
| 3 | DMRS + GC-PDCCH | Starting position of every two time slots |
| 4 | CSI-RS | 0th and 7th symbols of each time slot |

The terminal determines at least two groups of detection parameters for downlink transmission from the detection parameter set according to the identifier in the first configuration information.

For example, if the first configuration information carries identifiers 1 and 2, the terminal determines that a first group of detection parameters is "wideband DMRS, position of an odd-numbered OFDM symbol of each time slot", and a second group of detection parameters is "GC-PDCCH, starting position of each time slot".

In step 504, the terminal detects different downlink transmissions at different detection positions of the unlicensed frequency band according to the at least two groups of detection parameters.

Figure 6:
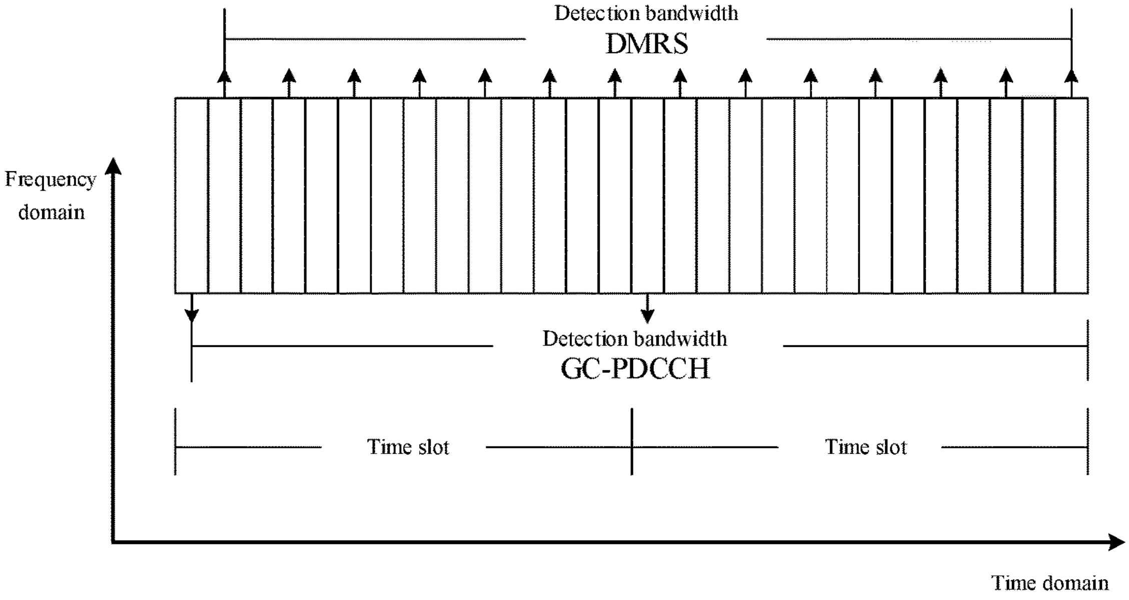
FIG. 6 is a time-frequency schematic diagram of a detection method for downlink transmission according to another exemplary embodiment of the present disclosure.

For example, the terminal detects the broadband DMRS at the position of the odd-numbered OFDM symbol of each time slot according to the first group of detection parameters, and the terminal detects the GC-PDCCH at the starting position of each time slot according to the second group of detection parameters, as shown in FIG. 6.

In step 505, the base station performs a clear channel assessment on the channel on the unlicensed frequency band.

The base station performs the clear channel assessment on the channel on the unlicensed frequency band by using the LBT mechanism. The LBT mechanism may be any one of the above LBT Cat.2, LBT Cat.3, and LBT Cat.4 mechanisms.

When the channel is in an idle state, it goes to step 406; and when the channel is in a busy state, it goes to a backoff time according to the LBT mechanism.

In step 506, when the channel is in an idle state, the base station transmits the downlink transmission by occupying the channel on the unlicensed frequency band.

When detecting the downlink transmission, the terminal determines that the channel on the unlicensed frequency band starts to be occupied, and/or the channel occupation time. The channel occupation time does not exceed the maximum channel occupation time (MCOT).

In summary, in the method according to an embodiment, a base station transmits first configuration information for configuring at least two groups of detection parameters for downlink transmission and a terminal simultaneously detects different downlink transmissions at different detection positions of an unlicensed channel according to the at least two groups of detection parameters for downlink transmission, so that the terminal may dynamically detect the downlink transmission of different signal or signaling types according to the first configuration information, which solves the problem of that there is no downlink transmission that is always transmitted in the 5G system and thus the terminal cannot detect the channel occupation of the base station on the unlicensed frequency band.

In an optional embodiment based on FIG. 4 and FIG. 5, the above detection parameter set is predefined by a communication protocol.

In an optional embodiment based on FIG. 4 and FIG. 5, the above detection parameter set is that the base station transmits second configuration information to the terminal, and the second configuration information is configured to configure the detection parameter set. The terminal determines the detection parameter set according to the second configuration information.

FIG. 3 illustrates a block diagram of a channel access configuration device according to another exemplary embodiment of the present disclosure. The device may be implemented as part or all of a terminal through software, hardware, or a combination thereof. The device includes:

a receiving module 302, configured to receive a configuration message, which is configured to configure a target attribute parameter of LBT Cat2; and a detection module 304, configured to perform channel state detection on an unlicensed frequency band by using the LBT Cat2 according to the target attribute parameter.

The target attribute parameter is one of at least two attribute parameters of the LBT Cat2.

In an optional embodiment, the detection module 304 is configured to, when the target attribute parameter is a first attribute parameter, determine a listening time period within a CCA duration, and perform the perform channel state detection on the unlicensed frequency band within the listening time period.

In an optional embodiment, the detection module 304 is configured to determine the listening time period within the CCA duration by itself; or, determine the listening time period within the CCA duration according to the first attribute parameter.

In an optional embodiment, the detection module 304 is configured to, when the target attribute parameter is a second attribute parameter, respectively determine listening time periods within a first time period and a second time period within the CCA duration, and perform the perform channel state detection on the unlicensed frequency band within the two listening time periods.

In an optional embodiment, the detection module 304 is configured to respectively determine the listening time periods within the first time period and the second time period within the CCA duration by itself; or, respectively determine the listening time periods within the first time period and the second time period within the CCA duration according to the second attribute parameter.

In an optional embodiment, the CCA duration is 16 us, and the listening time period is 4 us.

In an optional embodiment, the configuration message further includes an access condition of the LBT Cat2, and the detection module 304 is configured to, when the access condition is met, execute step of performing the channel state detection on the unlicensed frequency band by using the LBT Cat2 according to the target attribute parameter.

In an optional embodiment, the configuration message is a radio resource control (RRC) message.

Figure 7:
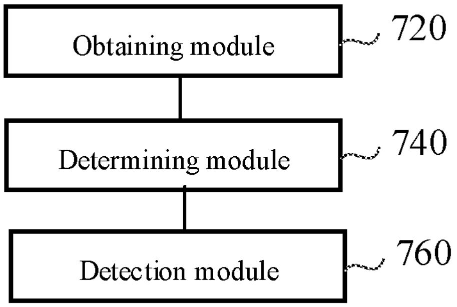
FIG. 7 is a block diagram of a detection device for downlink transmission according to another exemplary embodiment of the present disclosure.

FIG. 7 illustrates a block diagram of a detection device for downlink transmission according to an exemplary embodiment of the present disclosure. The device may be implemented as all or part of a terminal. The device includes:

an obtaining module 720, configured to obtain first configuration information;

a determining module 740, configured to determine a detection parameter for the downlink transmission according to the first configuration information; and a detection module 760, configured to detect the downlink transmission on an unlicensed frequency band according to the detection parameter.

In an optical embodiment, the determining module 740 is configured to determine the detection parameter for the downlink transmission from a detection parameter set according to the first configuration information, and wherein the detection parameter set includes at least two groups of detection parameters.

In an optical embodiment, the detection parameter includes a type of a to-be-detected signal or to-be-detected signaling, and the type of the to-be-detected signal or the to-be-detected signaling includes at least one of:

a broadband demodulation reference signal;

a group commonality physical downlink control channel;

a synchronization signal block;

a demodulation reference signal and the group commonality physical downlink control channel; and a channel-state information reference signal.

In an optical embodiment, the detection parameter includes a detection frequency for the downlink transmission.

In an optical embodiment, the detection parameter includes a detection mode, and the detection mode includes at least one of:

time-frequency position information of the to-be-detected signal or the to-be-detected signaling when being transmitted;

beam information of the to-be-detected signal or the to-be-detected signaling when being transmitted;

sequence information corresponding to the to-be-detected signal; and at least one of a length of downlink control information, a number of detections and an aggregation level, the length of the downlink control information, the number of detections and the aggregation level corresponding to the to-be-detected signaling.

In an optical embodiment, the first configuration information configures at least two groups of the detection parameters for the downlink transmission, and the detection module is configured to detect different downlink transmissions on different positions of the unlicensed frequency band according to the at least two groups of the detection parameters for the downlink transmission.

In an optical embodiment, the device further includes:

the obtaining module 720 further configured to: obtain the detection parameter set, wherein the detection parameter set is predefined; or receive second configuration information, wherein the second configuration information is configured to configure the detection parameter set.

Figure 8:
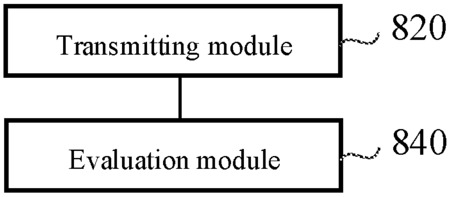
FIG. 8 is a block diagram of a detection device for downlink transmission according to another exemplary embodiment of the present disclosure.

FIG. 8 illustrates a block diagram of a detection device for downlink transmission according to an exemplary embodiment of the present device. The device may be implemented as all or part of an access network equipment (base station). The device includes:

a transmitting module 820, configured to transmit first configuration information, wherein the first configuration information is configured to configure a detection parameter for the downlink transmission; and an evaluation module 840, configured to perform a clear channel assessment on a channel on an unlicensed frequency band, and the transmitting module 820 is further configured to transmit the downlink transmission by occupying the channel on the unlicensed frequency band in response to the channel being in an idle state.

In an optical embodiment, the first configuration information is configured to determine the detection parameter for the downlink transmission from a detection parameter set, wherein the detection parameter set includes at least two groups of detection parameters.

In an optical embodiment, the detection parameter includes a type of a to-be-detected signal or to-be-detected signaling, and the type of the to-be-detected signal or the to-be-detected signaling includes at least one of:

a broadband demodulation reference signal;

a group commonality physical downlink control channel;

a synchronization signal block;

a demodulation reference signal and the group commonality physical downlink control channel; and a channel-state information reference signal.

In an optical embodiment, the detection parameter includes a detection frequency for the downlink transmission.

In an optical embodiment, the detection parameter includes a detection mode, and the detection mode includes at least one of:

time-frequency position information of the to-be-detected signal or the to-be-detected signaling when being transmitted;

beam information of the to-be-detected signal or the to-be-detected signaling when being transmitted;

sequence information corresponding to the to-be-detected signal; and at least one of a length of downlink control information, a number of detections and an aggregation level, the length of the downlink control information, the number of detections and the aggregation level corresponding to the to-be-detected signaling.

In an optical embodiment, the first configuration information is configured to configure at least two groups of the detection parameters for the downlink transmission, and the at least two groups of the detection parameters for the downlink transmission are configured for a terminal to detect different downlink transmissions on different positions of the unlicensed frequency band.

In an optical embodiment, the transmitting module 820 is configured to transmit second configuration information, wherein the second configuration information is configured to configure the detection parameter set.

Figure 9:
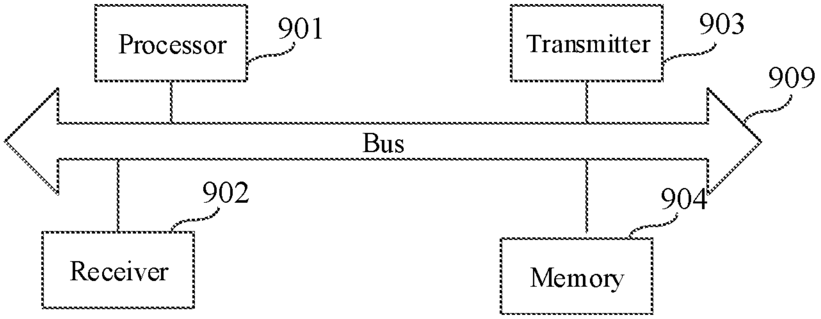
FIG. 9 is a block diagram of a terminal according to an exemplary embodiment of the present disclosure.

FIG. 9 shows a schematic structural diagram of a terminal according to an exemplary embodiment of the present disclosure. The terminal includes a processor 901, a receiver 902, a transmitter 903, a memory 904, and a bus 905.

The processor 901 includes one or more processing cores, and the processor 901 executes various functional applications and information processing by running software programs and modules.

The receiver 902 and the transmitter 903 may be implemented as a communication component, and the communication component may be a communication chip.

The memory 904 is connected to the processor 901 through the bus 905.

The memory 904 may be configured to store at least one instruction, and the processor 901 is configured to execute the at least one instruction to implement each step in the foregoing method embodiment.

In addition, the memory 904 may be implemented by any type of volatile or non-volatile storage device or a combination thereof. The volatile or non-volatile storage device includes, but is not limited to: a magnetic disk or optical disk, electrically erasable programmable read-only memory (EEPROM), erasable programmable read-only memory (EPROM), static random access memory (SRAM), read-only memory (ROM), magnetic memory, flash memory, programmable read-only memory (PROM).

In an exemplary embodiment, there is also provided a non-transitory computer-readable storage medium including instructions, such as a memory including instructions, which may be executed by a processor of a terminal to complete the method executed by the terminal side in the control signaling detection methods described above. For example, the non-transitory computer-readable storage medium may be ROM, random access memory (RAM), CD-ROM, magnetic tape, floppy disk, optical data storage device and the like.

A non-transitory computer-readable storage medium can enable a terminal to execute the above detection method for downlink transmission when instructions in the non-transitory computer storage medium are executed by a processor of the terminal.

Figure 10:
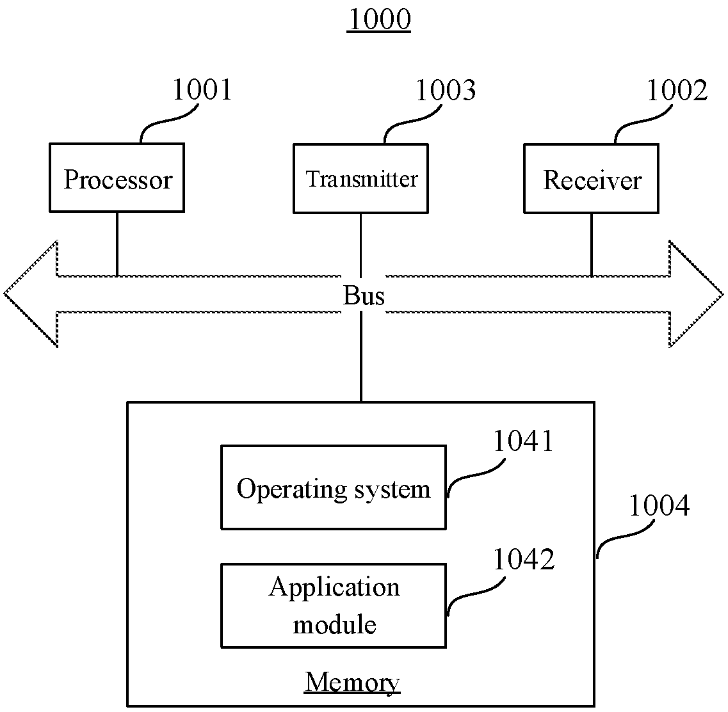
FIG. 10 is a block diagram of an access network device provided by an exemplary embodiment of the present disclosure.

FIG. 10 is a block diagram illustrating an access network device 1000 according to an exemplary embodiment. The access network device 1000 may be a base station.

The access network device 1000 may include a processor 1001, a receiver 1002, a transmitter 1003, and a memory 1004. The receiver 1002, the transmitter 1003, and the memory 1004 are respectively connected to the processor 1001 through a bus.

The processor 1001 includes one or more processing cores, and the processor 1001 executes the method executed by the access network device in the detection method for downlink transmission according to the embodiment of the present disclosure by running software programs and modules. The memory 1004 may be configured to store software programs and modules. Specifically, the memory 1004 may store an operating system 1041, an application module 1042 required by at least one function. The receiver 1002 is configured to receive communication data transmitted by other devices, and the transmitter 1003 is configured to transmit communication data to other devices.

An exemplary embodiment of the present disclosure also provides a detection system for downlink transmission (or communication system), and the system includes a terminal and an access network device.

The terminal includes the detection device for downlink transmission in the embodiment shown in FIG. 7.

The access network device includes the detection device for downlink transmission in the embodiment shown in FIG. 8.

An exemplary embodiment of the present disclosure also provides a detection system for downlink transmission (or communication system), and the detection system for downlink transmission includes a terminal and an access network device.

The terminal includes the terminal in the embodiment shown in FIG. 9.

The access network device includes the access network device in the embodiment shown in FIG. 10.

Here, a terminal obtains first configuration information, determines a detection parameter for downlink transmission according to the first configuration information, and detects the downlink transmission on an unlicensed frequency band according to the detection parameter, so that the terminal may dynamically detect the downlink transmissions of at least two different signal or signaling types according to the first configuration information, which solves the problem of that there is no downlink transmission that is always transmitted in the 5G system and thus the terminal cannot detect the channel occupation of the base station on the unlicensed frequency band, therefore the terminal can detect the occupancy of the base station on the unlicensed frequency band in time, and the power consumption of the terminal is saved.

An exemplary embodiment of the present disclosure also provides a computer-readable storage medium having at least one instruction, at least one program, a code set, or an instruction set stored thereon, the at least one instruction, the at least one program, the code set or the instruction set is loaded and executed by a processor to implement the steps executed by the terminal or the access network device in the detection method for downlink transmission provided by the above various method embodiments.

Those skilled in the art may understand that all or part of the steps in the above embodiments can be completed by hardware, or by a program instructing relevant hardware. The program may be stored in a computer-readable storage medium. The storage medium mentioned above may be a read-only memory, a magnetic disk, an optical disk or the like.

The above descriptions are only preferred embodiments of the present disclosure and are not intended to limit the present disclosure. Any modification, equivalent replacement, and improvement made within the spirit and principle of the present disclosure shall be included in the protection scope of the present disclosure.

What is claimed is:

1. A detection method for downlink transmission, comprising:

obtaining first configuration information, wherein the first configuration information carries at least two identifiers, and the at least two identifiers are configured to respectively indicate at least two groups of detection parameters in a detection parameter set;

determining, according to the first configuration information, the at least two groups of detection parameters for the downlink transmission from the detection parameter set; and detecting the downlink transmission on an unlicensed frequency band according to the at least two groups of detection parameters, wherein each of the at least two groups of detection parameters comprises a type of a to-be-detected signal or to-be-detected signaling, wherein each of the at least two groups of detection parameters further comprises a detection mode, and the detection mode comprises:

a number of detections of the to-be-detected signal or the to-be-detected signaling and an aggregation level corresponding to the to-be-detected signal or the to-be-detected signaling, wherein the at least two groups of detection parameters comprise a first group of detection parameters and a second group of detection parameters, and the type of to-be-detected signal or to-be-detected signaling in the first group of detection parameters is different from the type of to-be-detected signal or to-be-detected signaling in the second group of detection parameters, and detecting the downlink transmission on the unlicensed frequency band according to the at least two groups of detection parameters comprises:

detecting different types of to-be-detected signal or to-be-detected signaling on different positions of the unlicensed frequency band according to the at least two groups of detection parameters for the downlink transmission, the detection parameter set further comprises the at least two identifiers respectively corresponding to the at least two groups of detection parameters, and determining, according to the first configuration information, the at least two groups of detection parameters for the downlink transmission from the detection parameter set comprises:

determining, according to matching between the at least two identifiers carried by the first configuration information and the at least two identifiers comprised in the detection parameter set, the at least two groups of detection parameters for the downlink transmission from the detection parameter set.

2. The method according to claim 1, wherein the type of the to-be-detected signal or the to-be-detected signaling further comprises:

a synchronization signal block.

3. The method according to claim 1, wherein each of the at least two groups of detection parameters further comprises a detection frequency for the downlink transmission, and the detection frequency is a frequency at which a terminal detects the to-be-detected signal or the to-be-detected signaling on a channel of the unlicensed frequency band.

4. The method according to claim 1, wherein the detection mode further comprises:

time-frequency position information of the to-be-detected signal or the to-be-detected signaling when being transmitted.

5. The method according to claim 1, further comprising:

obtaining the detection parameter set, wherein the detection parameter set is predefined; or receiving second configuration information, wherein the second configuration information is configured to configure the detection parameter set.

6. The method according to claim 1, wherein detecting the different types of the to-be-detected signal or the to-be-detected signaling on the different positions of the unlicensed frequency band according to the at least two groups of detection parameters for the downlink transmission comprises:

detecting different types of the to-be-detected signal or the to-be-detected signaling on different time domain positions of the unlicensed frequency band according to the at least two groups of detection parameters for the downlink transmission.

7. The method according to claim 1, wherein the detection mode further comprises:

a length of downlink control information corresponding to the to-be-detected signaling.

8. A detection method for downlink transmission, comprising:

transmitting first configuration information, wherein the first configuration information carries at least two identifiers, the at least two identifiers are configured to respectively indicate at least two groups of detection parameters in a detection parameter set and the first configuration information is configured for a terminal to determine the at least two groups of detection parameters for the downlink transmission from the detection parameter set;

performing a clear channel assessment on a channel on an unlicensed frequency band; and transmitting the downlink transmission by occupying the channel on the unlicensed frequency band in response to the channel being in an idle state, wherein each of the at least two groups of detection parameters comprises a type of a to-be-detected signal or to-be-detected signaling, wherein each of the at least two groups of detection parameters further comprises a detection mode, and the detection mode comprises:

a number of detections of the to-be-detected signal or the to-be-detected signaling and an aggregation level corresponding to the to-be-detected signal or the to-be-detected signaling, wherein the at least two groups of detection parameters comprise a first group of detection parameters and a second group of detection parameters, and the type of to-be-detected signal or to-be-detected signaling in the first group of detection parameters is different from the type of to-be-detected signal or to-be-detected signaling in the second group of detection parameters, the at least two groups of detection parameters are configured for the terminal to detect different types of to-be-detected signal or to-be-detected signaling on different positions of the unlicensed frequency band, the detection parameter set further comprises at least two identifiers respectively corresponding to the at least two groups of detection parameters, and the first configuration information is configured for the terminal to determine, according to matching between the at least two identifiers carried by the first configuration information and the at least two identifiers comprised in the detection parameter set, the at least two groups of detection parameters for the downlink transmission from the detection parameter set.

9. The method according to claim 8, wherein the type of the to-be-detected signal or the to-be-detected signaling comprises:

a synchronization signal block.

10. The method according to claim 8, wherein each of the at least two groups of detection parameters further comprises a detection frequency for the downlink transmission, and the detection frequency is a frequency at which the terminal detects the to-be-detected signal or the to-be-detected signaling on a channel of the unlicensed frequency band.

11. The method according to claim 8, wherein the detection mode further comprises:

time-frequency position information of the to-be-detected signal or the to-be-detected signaling when being transmitted.

12. The method according to claim 8, further comprising:

transmitting second configuration information, wherein the second configuration information is configured to configure the detection parameter set.

13. The method according to claim 8, wherein the detection mode further comprises:

a length of downlink control information corresponding to the to-be-detected signaling.

14. A detection device for downlink transmission, comprising:

at least one processor; and a memory, having instructions stored thereon that, when executed by the processor, cause the at least one processor to perform:

obtaining first configuration information, wherein the first configuration information carries at least two identifiers, the at least two identifiers are configured to indicate at least two groups of detection parameters in a detection parameter set;

determining, according to the first configuration information, the at least two groups of detection parameters for the downlink transmission from the detection parameter set; and detecting the downlink transmission on an unlicensed frequency band according to the at least two groups of detection parameters, wherein each of the at least two groups of detection parameters comprises a type of a to-be-detected signal or to-be-detected signaling, wherein each of the at least two groups of detection parameters further comprises a detection mode, and the detection mode comprises:

a number of detections of the to-be-detected signal or the to-be-detected signaling and an aggregation level corresponding to the to-be-detected signal or the to-be-detected signaling, wherein the at least two groups of detection parameters comprise a first group of detection parameters and a second group of detection parameters, and the type of to-be-detected signal or to-be-detected signaling in the first group of detection parameters is different from the type of to-be-detected signal or to-be-detected signaling in the second group of detection parameters, and detecting the downlink transmission on the unlicensed frequency band according to the at least two n groups of detection parameters comprises:

detecting different types of to-be-detected signal or to-be-detected signaling on different positions of the unlicensed frequency band according to the at least two groups of detection parameters for the downlink transmission, the detection parameter set further comprises at least two identifiers respectively corresponding to the at least two groups of detection parameters, and determining, according to the first configuration information, the at least two groups of detection parameters for the downlink transmission from the detection parameter set comprises:

determining, according to matching between the at least two identifiers carried by the first configuration information and the at least two identifiers comprised in the detection parameter set, the at least two groups of detection parameters for the downlink transmission from the detection parameter set.

15. The device according to claim 14, wherein the type of the to-be-detected signal or the to-be-detected signaling further comprises a synchronization signal block.

16. The device according to claim 14, wherein each of the at least two groups of detection parameters further comprises a detection frequency for the downlink transmission, and the detection frequency is a frequency at which a terminal detects the to-be-detected signal or the to-be-detected signaling on a channel of the unlicensed frequency band.

17. The device according to claim 14, wherein the detection mode further comprises:

time-frequency position information of the to-be-detected signal or the to-be-detected signaling when being transmitted.

18. The device according to claim 14, wherein the detection mode further comprises:

a length of downlink control information corresponding to the to-be-detected signaling.

* * * * *